Feb. 20, 1951     G. H. STONER ET AL     2,542,160
ELECTRONIC INTEGRATING CIRCUIT
Filed Feb. 28, 1948
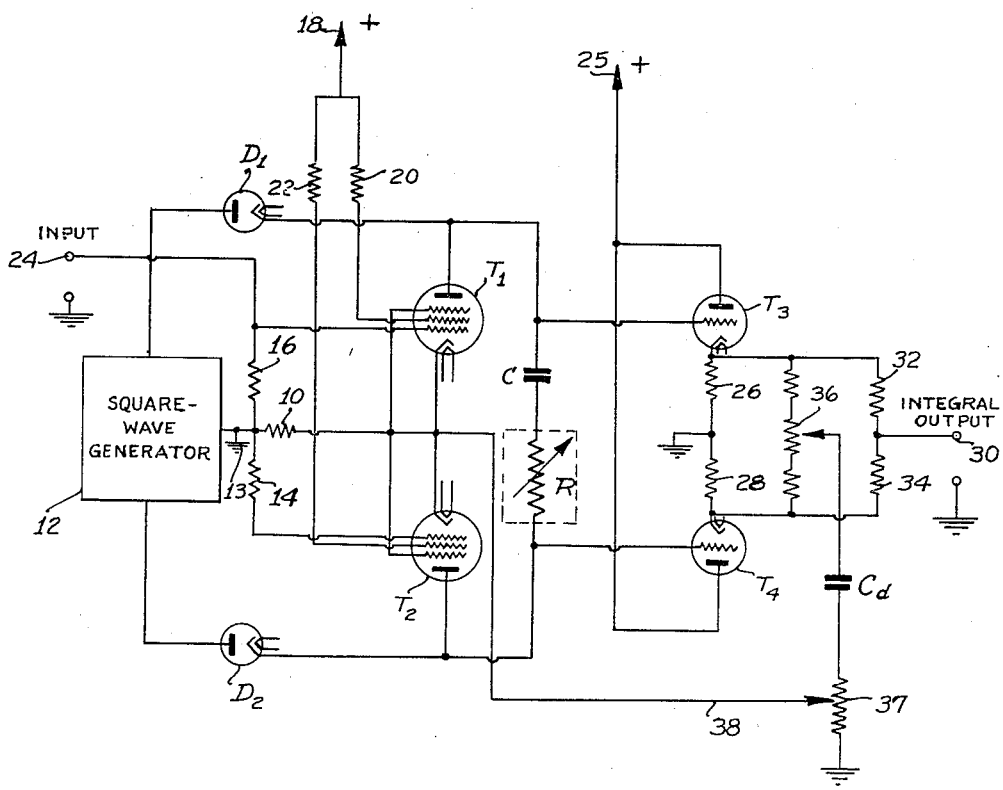
INVENTORS
GEORGE H. STONER
WILLIAM A. SOURWINE
BY
*Reynolds + Beach*
ATTORNEYS Patented Feb. 20, 1951

2,542,160

UNITED STATES PATENT OFFICE 2,542,160

ELECTRONIC INTEGRATING CIRCUIT

George H. Stoner and William A. Sourwine, Seattle, Wash., assignors to Boeing Airplane Company, a corporation of Delaware Application February 28, 1948, Serial No. 11,884

12 Claims. (Cl. 250—27)

This invention relates to an electronic circuit for automatically integrating currents or voltages, representing selected variables, applied to it to produce corresponding output currents or voltages representing the integrals of such variables. The terms "integrate," "integral," or "integrating," as herein used, have reference to the mathematical operation or function of integration. An input or applied voltage integrated in this sense, whether an alternating or direct voltage, results in an integral output voltage related in form, viz. alternating or direct, to the input voltage, but whose amplitude or magnitude, as a function of lapsed time of application, represents the integral value of the amplitude or magnitude of the applied voltage.

The invention is concerned primarily with the solution of various electric circuit problems of mathematically integrating currents and voltages, in the general field of precision electrical calculating devices, navigation-aiding instruments, or similar apparatus. There problems frequently arise in which alternating voltages, direct voltages, or combinations of both are "known" to a device, determined and available, and where the corresponding integrals of such voltages or combinations of them are required in order to operate or control continuously a coacting, receptive device, such as a recording or indicating instrument, for example. Integrating the derived output voltage of a gyroscopic angular rate-determining device in a navigational-aid system, where the derived voltage is proportional to the rate of turning of an aircraft for example, to produce an integral voltage representing total angle turned at such rate, represents a typical situation of this type and to which the invention may be applied.

Oftentimes it is desirable that the integrating device, in addition to performing simply the function of integrating selected input direct or alternating voltages, or both, also produce in a resulting output voltage not only an integral component but also a voltage component related directly to input, both as to its amplitude and as to its polarity or time-phase. Someitmes it is desirable to adjust the relative magnitudes of such direct and integral components, or to eliminate one of them altogether.

The general object of this invention is to provide a device capable of operating for such purposes and having the stability and precision adapting it to the most stringent requirements of the various instances in which it may apply. Another object of the invention is to provide such a circuit the accuracy of which is substantially insensitive to fluctuations or variations in its vacuum tube plate supply voltage delivered to it from a power source, an exemplary situation occurring abroad a vehicle, such as an aircraft, where electric power generator loads vary from time to time, causing line voltage fluctuations.

Other objects are to provide a vacuum tube, integrating circuit whose operational accuracy may be made substantially independent of differences in characteristics or functioning of nominally identical or balanced vacuum tubes, by effecting a simple compensatory circuit adjustment, and to be able to compensate in the same manner for inaccuracies which may tend to arise from other sources. A further purpose is to deliver the integral output voltage at a low level of impedance for convenience in transmission over appreciable distances or for application to coacting low impedance circuits, and to free the output voltage of vacuum tube plate supply voltage fluctuations or components of voltage, so that it will contain only the desired components related to input voltage.

A principal feature of our invention resides in the combination of balanced circuit branches comprising vacuum tube amplifiers functioning as "constant current" devices, wherein plate current is dependent directly upon control grid voltage and independent of anode voltage within the operating range of the tubes, which tubes respectively control the flow of current alternately, in opposite directions, through an integrating network such as a network of the resistance-capacitance type. In such a device the impedance to current flow of one of those tubes relative to the other is controlled in accordance with the input or "known" voltage. An average difference in such reversely flowing currents over several cycles of reversal results in the accumulation on the condenser of a net integral charge proportional to the desired integral voltage. At the same time, the voltage developed in the network resistor, by current flow therein, if a separate resistor is employed in addition to the plate resistances of said vacuum tubes, is related directly to the instantaneous value of the input voltage.

In accordance with another feature of our invention, such network voltages are applied, separately or in combination, to a balanced cathode-follower type output circuit of high input and low output impedances and connected to deliver integral output voltage at output terminals one of which may be at ground potential, having balanced out and removed voltage components attributed only to variations in supply voltage to the vacuum tubes.

In conjunction with such a combined circuit, a further important feature of our invention resides in the provision of voltage feed-back means returning a portion of the output voltage for application as a compensatory bias voltage to the constant-current-functioning vacuum tubes, to compensate both for departures in their operation from strictly "constant-current" operation, and for eliminating the effect of uncontrolled leakage of charge from the storage condenser in the integrating network.

These and other aspects of the invention will become further apparent from the following detailed description referring to the accompanying drawing which is a schematic diagram of a circuit representing a preferred embodiment of our invention and reduced to a simple operative form.

In its illustrated form, the parallel circuit branches comprise a pair of vacuum tube amplifiers T1 and T2, such as pentodes, arranged with their cathodes connected commonly through a cathode-bias resistor 10 to ground, and with their anodes connected to the cathodes of diode rectifiers D1 and D2, respectively, having anodes connected to the opposite output terminals of a source of alternating current, such as square-wave generator 12. Positive pulses of voltage derived from square-wave generator 12 are thereby applied as anode voltage to the anodes of tubes T1 and T2 in alternate sequence. Generator 12 is adapted to produce a square or rectangular wave of voltage having positive and negative portions which are effectively balanced with respect to ground or other intermediate constant potential point, as illustrated by the ground connection at 13.

Diodes D1 and D2 act as a representative form of switching device, although any of various other types of switching devices could be used. Each diode is capable of passing current from the associated terminal of generator 12 directly to the anode of the corresponding amplifier tube T1 or T2, current passing to the anode of tube T1 on one half cycle of square wave voltage, while at the same time the opposite diode, D2, isolates its side of generator 12 from the amplifier circuit. On the succeeding half cycle, current passes to the anode of tube T2 while flow of current to tube T1 is blocked at that time. It is to be understood that different forms of alternating current sources capable of generating wave forms other than square or rectangular waves may be employed optionally in lieu of generator 12, without appreciably affecting the hereinafter described operation of the circuit. However the use of a square wave generator is preferred over other forms, because, except during the short time in each half cycle when the voltage reverses, the anode voltage applied to amplifier tubes T1 and T2 on their respective half cycles of conduction remains substantially constant throughout such half cycle, at a value which may be selected as optimum for operation of the tubes as constant current devices.

As constant current devices, amplifier tubes T1 and T2 pass plate currents which are substantially wholly dependent upon their control grid voltage and almost entirely independent of plate voltage variations, within a wide range of plate voltages. Pentode amplifier tubes possess this characteristic to a marked degree and pentagrid tubes are even less affected by plate voltage variations. With the use of negative feed-back in the circuit in a manner to be described, any deficiencies of the tubes in this respect may be compensated, even making possible the use of triodes which are not usually thought of as constant current tubes. Pentodes T1 and T2 may be replaced by amplifiers of even greater operating precision, such as pentagrid tubes, suitably connected in a circuit for filament heater drift compensation in known manner, and, for operating stability, arranged with their first and second control grids connected together to form virtual cathodes in the tubes adding to the linearity of their constant current characteristics.

In the illustrated circuit, the first or control grid of tube T2 is connected to a source of constant voltage, such as ground, through grid-leak resistor 14 while the control grid of tube T1 is returned to ground potential through grid-leak resistor 16, but is impressed directly with the input voltage to be integrated, applied to terminal 24. The third or suppressor grids of the tubes are connected directly to their respective cathodes in the usual manner, and their second or screen grids are returned to a constant voltage terminal 18 through the respective screen grid resistors 20 and 22, the circuit thus far described being balanced in all respects, excepting the application of the input voltage to but one of the tubes, T1.

Series-connected, condenser C and variable resistor R, or, as a modification, condenser C without resistor R, form an integrating network directly bridging the anodes of tubes T1 and T2. The circuit functions differently with and without separate resistor R, as will be explained.

On one half cycle of square wave voltage from generator 12, a pulse of anode current flows in the circuit path only through a selected one of tubes T1 or T2 and the integrating network in one direction, whereas on the succeeding half cycle current flows through only the other tube and through the network in the opposite direction. Depending upon the relative conductivity of tubes T1 and T2, a residual charge remains on the terminals of condenser C following a full cycle of square wave voltage and in ensuing cycles the net charge may vary as relative conductivity of the tubes varies. While under some conditions both of tubes T1 and T2 may conduct simultaneously, the one not then included in the circuit path with the integrating network has no appreciable effect on circuit operation at that time.

Such relative or differential conductivity of tubes T1 and T2 is determined directly in accordance with the input voltage applied as a controlling bias to the control grid of tube T1, since the voltage of the control grid of tube T2 remains unvaried at ground potential. Out integrating circuit makes use of the basic principle that the charge, and hence the voltage, of a condenser is directly proportional to the integral of condenser charging current with respect to time. Inasmuch as the flow of current through condenser C during a half cycle of conduction of tube T1 is determined solely by the input voltage at terminal 24, such tube being a constant current generator, the voltage variation of condenser C directly follows the integral of such input voltage with respect to time. On the succeeding half cycle when tube T2 conducts this charge is subtracted to an extent depending only upon the conductivity of tube T2, which is the same at all times. Over a period of time, therefore, tube T1 produces a total charge on the condenser related, as the integral, to input voltage, whereas tube T2 merely determines the zero point or reference, the net integral charge on condenser C being zero if input voltage is zero, and positive or negative depending upon whether the input voltage is positive or negative with respect to ground.

In order to convert the voltage or charge on condenser C into an integral output voltage at low impedance, which is referred to ground potential, and which is freed from components of voltage attributable only to the anode voltage of tubes T1 and T2, from square wave generator 12, the voltage at the opposite sides of condenser C, with resistor R absent, is applied to an output circuit comprising balanced cathode-follower-type amplifiers T3 and T4. With the high input impedance common to cathode-follower-type amplifiers the output circuit has no noticeable effect upon the charging or discharging of condenser C, thereby enhancing the accuracy of the combined circuit, and with the low output impedance as well, also common to such amplifiers, any electronic or other device to which the integral output voltage is applied can have negligible reactionary effect upon the integrating circuit. Consequently the applied voltage output will be substantially free of the interference effects of stray fields and pick-up in connecting leads employed.

The anodes of the cathode-follower-amplifier tubes T3 and T4 are supplied from a common source of constant direct voltage applied at terminal 25. Their cathodes are returned to ground through the respective cathode resistors 26 and 28, and are bridged directly by a parallel circuit including potentiometer 36 employed in a regenerative feed back arrangement, and a second parallel circuit comprising equal resistors 32 and 34 forming an averaging circuit. From the connection between resistors 32 and 34 the desired integral output voltage is taken for application to output terminal 30, representing the average or mean of the respective potentials of the cathodes of tubes T3 and T4. The anode voltage wave applied to tubes T1 and T2 is balanced out in the averaging circuit so that there is no voltage square-wave at terminal 30 when the input voltage at terminal 24 is zero.

The voltage which does appear at output terminal 30, with resistor R absent from the integrating network, is in the form of a fluctuating or variable square wave voltage, the amplitude of which bears an integral relation to the input voltage, and the phase of which bears a direct relation to the sign of the integral of the input, phase being relative to the square wave of generator 12, and either in or out of phase with it.

Should it be desired to produce a modified integral output voltage which includes not only the net integral voltage developed by condenser C acting in conjunction with the plate resistances of tubes T1 and T2 but also a component related directly, linearly, to the input voltage, the addition of resistor R may be resorted to, connected in series with condenser C between the network connecting points for the grids of amplifier tubes T3 and T4.

With resistor R thus connected in the circuit, as shown, the flow of current through such resistor produces a corresponding voltage drop which is related directly to input voltage, for producing the combined, or modified, integral output voltage which is the sum of the direct and purely integral components. Thus the combined condenser and resistor voltage thereby is impressed across the grids of tubes T3 and T4. The relative proportions of its components may be varied by adjusting the value of resistor R.

In order to improve the constant-current characteristics of the amplifier circuits comprising tubes T1 and T2, and in order to correct also for other circuit deviations from the optimum conditions, such as for uncontrolled leakage of condenser C, or the like, we arrange for the application regeneratively, of a portion of the output voltage as a compensative bias to the commonly connected cathodes of tubes T1 and T2. The voltage thus applied is derived initially from the variable contact of the zero-setting potentiometer 36, applied to feed-back control potentiometer 37 from which a selected amount of voltage may be transmitted to such cathodes over feed-back lead 38. D. C. blocking condenser $C_d$ is interposed between potentiometers 36 and 37 to prevent the bias voltage at the cathodes of T1 and T2 from affecting the output circuit.

The effect of feed-back may be observed by assuming the flow of current through tubes T1 and T2 to increase and decrease with rising and falling anode voltages applied to them as condenser C accumulates and loses charge, instead of such flow remaining constant, as would be the case with an ideal constant current generator. The necessary feed-back corrective bias applied to the cathodes of both tubes T1 and T2 may then be selected by adjusting the tap of potentiometer 37 to apply a selected proportion of the integral output voltage wave to such cathodes, effectively creating an increasing bias applied to the amplifier tube, T1 or T2, whose anode voltage increases with the accumulation of charge on condenser C while applying an equally decreasing bias to the other tube, whose anode voltage decreases at the same rate as the rate of voltage increase on the anode of the former tube. It will be seen that the phase of the feed-back voltage relative to generator 12 is automatically proper to produce this result.

Potentiometer 36 may be set near its mid-point to balance the circuit initially for producing zero output voltage under conditions of zero input voltage. A proper setting of potentiometer 37 also inherently takes into account uncontrolled leakage of condenser C, at the same time it is set to compensate for correcting the operation of tubes T1 and T2.

An important operational advantage of the circuit resides in its relative independence to uncontrolled and unpredicted changes in power supply voltage. This constitutes a distinct advantage in circumstances where line supply voltage fluctuates, such as aboard an aircraft or other vehicle. Such advantage derives from the constant current characteristics and balanced circuit arrangement of tubes T1 and T2, in the input portion of the circuit, and the balanced arrangement of tubes T3 and T4 in the output portion of the circuit. The pairs of tubes in each portion of the circuit are individually affected alike by random fluctuations in supply voltage, provided such fluctuations occur relatively slowly compared to a single cycle of square wave supply voltage from generator 12, which almost always will be the case.

We claim as our invention:

1. In an electrical integrating circuit the combination comprising a pair of vacuum-tube amplifiers connected for substantially constant-current operation, means connected to the respective anodes of said amplifiers to apply potential to such anodes alternately, recurringly and in equal pulses, reference voltage means connected between the control elements of one of said amplifiers to establish its conductivity in accordance with such reference voltage, input voltage means connected to the corresponding control elements of the other of said amplifiers to deliver thereto an input voltage to be integrated, to control the conductivity of said latter amplifier in accordance with such input voltage, an integrating network connected between the anodes of said amplifiers to establish a circuit for current flow, from the anode of each of said amplifiers through said network and the other amplifier in series, to carry the respective anode currents of said latter amplifiers flowing alternately and in opposite directions through such network, said network comprising charge accumulating means arranged to accumulate a net integral charge from such alternately opposite flow of currents in said network, and output circuit means having an input connected to said integrating network to receive the integral charge voltage of said charge accumulating means, and an output.

2. The integrating device defined in claim 1, and adjustable feed-back means operatively interconnecting the output of the output circuit means and corresponding control elements of the vacuum-tube amplifiers.

3. In an electrical integrating circuit the combination comprising a pair of vacuum tube amplifiers connected for substantially constant-current operation, means connected to the respective anodes of said amplifiers to apply thereto succeeding half-wave portions of a balanced alternating potential wave, reference voltage means connected between the control elements of one of said amplifiers to establish its conductivity in accordance with such reference voltage, input voltage means connected to the corresponding control elements of the other of said amplifiers to deliver thereto an input voltage to be integrated, to control the conductivity of said latter amplifier in accordance with such input voltage, an integrating network connected between the anodes of said amplifiers to establish a circuit for current flow from the anode of each of said amplifiers through said network and the other amplifiers in series, to carry the respective anode currents of said amplifiers flowing alternately and in opposite directions through such network, said network comprising a condenser arranged to accumulate a net integral charge from such alternately opposite flow of currents in said network, and output circuit means connected to the terminals of said integrating network to receive the integral charge voltage of said condenser for output application, said output circuit means comprising balanced circuit means operable to pass selectively to its output only the network voltage related to input voltage.

4. In an electrical integrating device the combination comprising a pair of vacuum tube amplifiers connected to function as constant current devices, a source of square-wave voltage having opposite terminals connected to the respective anodes of said amplifiers, separate rectifier means interposed operatively between each of said anodes and one of said terminals, respectively, to pass current from said terminals to said anodes, reference voltage means connected to the control means of one of said amplifiers to establish its conductivity in accordance with the reference voltage, input voltage means connected to the corresponding control means of the other of said amplifiers to establish its conductivity in accordance with an input voltage to be integrated, an integrating network connected between said anodes and including a charging condenser, and an output circuit comprising a balanced pair of cathode-follower type amplifiers having their control grids connected to said network at opposite sides of said condenser, a common return point for the flow of current in said balanced cathode followers, and balanced resistor means connected between the cathodes of said cathode-follower amplifiers, the mid-point of said resistor means comprising the circuit output point.

5. The device as defined in claim 4 in which the first-named amplifiers comprise multigrid vacuum tubes employed to sustain anode current of a value substantially independent of the value of anode voltage thereof within the operating range of the circuit.

6. In an electrical integrating device the combination comprising a pair of vacuum tube amplifiers, a source of square-wave voltage having opposite terminals connected to the respective anodes of said amplifiers, separate rectifier means interposed operatively between each of said anodes and one of said terminals, respectively, to pass current from said terminals to said anodes, reference voltage means connected to the control means of one of said amplifiers to establish its conductivity in accordance with the reference voltage, input voltage means connected to the corresponding control means of the other of said amplifiers to establish its conductivity in accordance with an input voltage to be integrated, an integrating network connected between said anodes and including a charging condenser, an output circuit comprising a balanced pair of cathode-follower type amplifiers having their control grids connected to said network at opposite sides of said condenser, a common return point for the flow of current in said balanced cathode followers, and balanced resistor means connected between the cathodes of said cathode-follower amplifiers, the mid-point of said resistor means comprising the circuit output point, and means to apply to said first-named amplifiers in common a bias voltage which is directly related to the voltage at said circuit output point.

7. In an electronic integrating circuit, the combination of a pair of balanced circuit branches each including an amplifier tube connected to function as a constant-current device, a source of alternating potential having opposite output terminals connected respectively to the anodes of said amplifier tubes to deliver anode potential pulses thereto in time alternation, rectifier means operatively interposed in each of the connections between said opposite output terminals and the respective amplifier tube anodes, input voltage means connected to the control means of one of said amplifier tubes to establish the conductivity thereof in accordance with an input voltage to be integrated, reference voltage means connected correspondingly to the control means of the other of said amplifier tubes to establish its conductivity in accordance with a reference voltage, said balanced circuit branches having in common an integrating network connected between the anode circuits of said amplifier tubes to carry the respective anode currents thereof, flowing, in time alternation, oppositely in such network, a condenser arranged in said network to accumulate from such oppositely flowing currents therein a net integral charge integrally proportional to the average difference in magnitude of said oppositely flowing currents, an output circuit comprising balanced cathode-follower amplifiers having their inputs connected to opposite sides of said condenser, an averaging network including equal series-connected resistors the common mid-point of which comprises a circuit output point and the free ends of which are connected to the outputs of said cathode-follower amplifiers, respectively, and feed-back means interconnecting said output circuit and corresponding control elements of said first amplifiers to apply to such elements a feed-back potential related directly to the potential on said circuit output point, thereby to correct for non-constant-current tendencies in the first-named amplifier tubes.

8. In an electronic integrating circuit, the combination of a pair of balanced circuit branches each including an amplifier tube connected to function as a constant-current device, a source of alternating potential having opposite output terminals connected respectively to the anodes of said amplifier tubes to deliver anode potential pulses thereto in time alternation, rectifier means operatively interposed in each of the connections between said opposite output terminals and the respective amplifier tube anodes, input voltage means connected to the control means of one of said amplifier tubes to establish the conductivity thereof in accordance with an input voltage to be integrated, reference voltage means connected correspondingly to the control means of the other of said amplifier tubes to establish its conductivity in accordance with a reference voltage, said balanced circuit branches having in common an integrating network connected between the anode circuits of said amplifier tubes to carry the respective anode currents thereof, flowing, in time alternation, oppositely in such network, a condenser and a resistor connected in series in said network, said condenser being arranged therein to accumulate from such oppositely flowing currents therein a net integral charge integrally proportional to the average difference in magnitude of said oppositely flowing currents, an output circuit comprising balanced cathode-follower amplifiers having their inputs connected to opposite sides of said series-connected resistor and condenser, an averaging network including equal series-connected resistors the common mid-point of which comprises a circuit output point and the free ends of which are connected to the outputs of said cathode-follower amplifiers, respectively, and feed-back means interconnecting said output circuit and corresponding control elements of said first amplifiers to apply to such elements a feed-back potential related directly to the potential on said circuit output point, thereby to correct for non-constant-current tendencies in the first-named amplifier tubes.

9. The circuit defined in claim 7, in which the feed-back means includes a first potentiometer having its resistance terminals connected between the cathodes of the cathode-follower amplifiers, and its variable tap adjustable to select initially a feed-back voltage to produce a circuit balance, a second potentiometer having one of its resistance terminals connected to said variable tap of said first potentiometer for receiving such balancing feed-back voltage, and its variable tap connected to the corresponding control elements of the first-named amplifiers for applying thereto a selected portion of such balancing feed-back voltage.

10. The circuit defined in claim 8, in which the feed-back means includes a first potentiometer having its resistance terminals connected between the cathodes of the cathode-follower amplifiers, and its variable tap adjustable to select initially a feed-back voltage to produce a circuit balance, a second potentiometer having one of its resistance terminals connected to said variable tap of said first potentiometer for receiving such balancing feed-back voltage, and its variable tap connected to the corresponding control elements of the first-named amplifiers for applying thereto a selected portion of such balancing feed-back voltage.

11. The method of integrating a variable quantity electronically by charging a capacitance, comprising the steps of passing pulses of current successively and alternately in opposite directions through the capacitance to accumulate a net integral charge thereon, the oppositely flowing current pulses being of equal time duration, controlling the pulses flowing in one direction, at substantially constant amplitude, controlling the pulses flowing in the opposite direction, at an amplitude determined in accordance with an input voltage to be integrated, and deriving an output voltage related to the net accumulated charge on said capacitance, continuously, as a measure of the integral of said input voltage.

12. The method employing a capacitance and coacting current limiting resistance, of integrating a variable quantity and adding the integral to such quantity electronically, comprising the steps of passing pulses of current successively and alternately in opposite directions through the capacitance and coacting current limiting resistance, to accumulate a net integral charge on said capacitance, the oppositely flowing current pulses being of equal time duration, controlling the pulses flowing in one direction, at substantially constant amplitude, controlling the pulses flowing in the opposite direction, at an amplitude determined in accordance with an input voltage to be integrated, and deriving an output voltage related to the net sum of the net accumulated charge voltage on said capacitance and the voltage drop in said resistance continuously.

GEORGE H. STONER.
WILLIAM A. SOURWINE.

REFERENCES CITED

The following references are of record in the file of this patent:

UNITED STATES PATENTS

| Number | Name | Date |
|---|---|---|
| 1,912,234 | Willoughby | May 30, 1933 |
| 2,251,973 | Beale | Aug. 12, 1941 |
| 2,400,822 | Hansell | May 21, 1946 |
| 2,412,485 | Whitely | Dec. 10, 1946 |
| 2,413,063 | Miller | Dec. 24, 1946 |